(12) United States Patent
Takeuchi (10) Patent No.: US 6,370,924 B1
(45) Date of Patent: Apr. 16, 2002

(54) WARP-KNITTED FABRIC FOR INFLATABLE BELT COVER

(75) Inventor: Hiroyuki Takeuchi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/482,118

(22) Filed: Jan. 13, 2000

(30) Foreign Application Priority Data

Jan. 13, 1999 (JP) .......................................... 11-006692
Sep. 29, 1999 (JP) .......................................... 11-276855

(51) Int. Cl.$^7$ .............................................. D04B 21/20
(52) U.S. Cl. .......................................... 66/193; 66/195
(58) Field of Search .............................. 280/733, 728.1, 280/729; 66/195, 192, 193, 169 R, 170; 442/313, 314, 304, 308

(56) References Cited

U.S. PATENT DOCUMENTS

| | | | | |
|---|---|---|---|---|
| 5,385,367 A | * | 1/1995 | Tanaka et al. .............. | 280/733 |
| 5,692,777 A | * | 12/1997 | Tochacek et al. ......... | 280/743.1 |
| 6,082,763 A | * | 7/2000 | Kokeguchi .................. | 280/733 |
| 6,116,637 A | * | 9/2000 | Takeuchi et al. ............ | 280/733 |
| 6,170,863 B1 | * | 1/2001 | Takeuchi et al. ............ | 280/733 |
| 6,217,063 B1 | * | 4/2001 | Takeuchi .................... | 280/733 |

FOREIGN PATENT DOCUMENTS

JP         9-23903        2/1997

* cited by examiner

Primary Examiner—Danny Worrell
(74) Attorney, Agent, or Firm—Foley & Lardner

(57) ABSTRACT

The invention is a warp-knitted fabric for an inflatable belt cover for covering an envelope-like belt which composes an inflatable belt that is folded into the shape of a band. The warp-knitted fabric comprises knitting yarns and insert yarns inserted among the knitting yarns. At least two continuous loops are formed by chain-stitching the knitting yarn to compose a base knit structure having multiple vertical loop arrays. Each insert yarn is twined to pass through three or more vertical arrays of loops, thereby significantly improving the fabric's resistance to "run".

2 Claims, 7 Drawing Sheets

WARP-KNITTED FABRIC FOR INFLATABLE BELT COVER

FIELD OF THE INVENTION

The present invention relates to a warp-knitted fabric used in an inflatable belt cover for covering an envelope-like belt of an inflatable belt device. The envelope-like belt is a part of a seat belt and is inflatable with gas from a gas generator for protecting an occupant of a vehicle in a vehicle collision.

BACKGROUND OF THE INVENTION

In Japanese Patent Application No. H09-23903, hereinafter referred to as the "'903 application", the applicant of this invention has previously proposed an inflatable belt device which comprises an inflatable belt and a gas generator which supplies gas into the inflatable belt to inflate the inflatable belt. The inflatable belt comprises an envelope-like belt folded in a band-like configuration and a cover surrounding the envelope-like belt. The cover is hard to stretch in the longitudinal direction, but is stretchable in the inflating direction of the inflatable belt. This stretch of the inflatable belt in the inflating direction shortens the length of the inflatable belt in the longitudinal direction.

Figure 2:
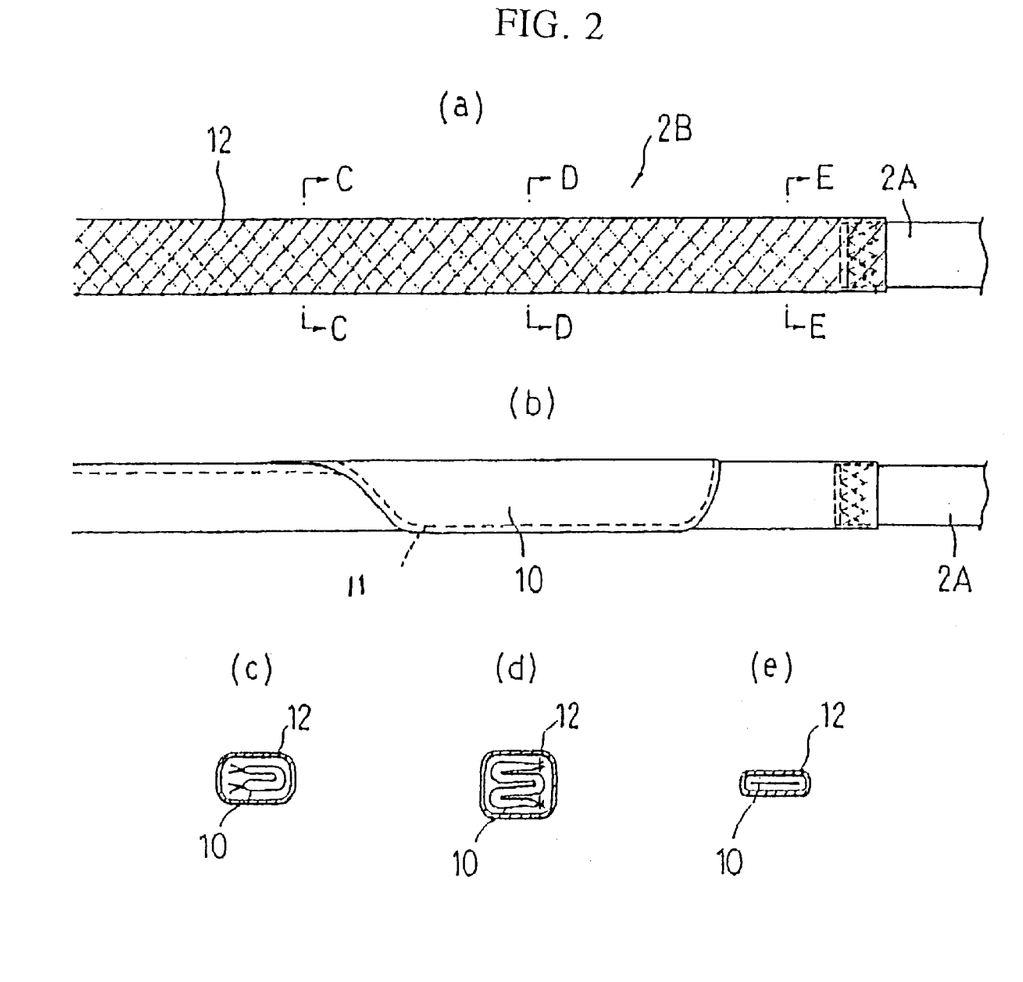
FIGS. 2(a)–2(e) are structural views of the inflatable belt.
Figure 3:
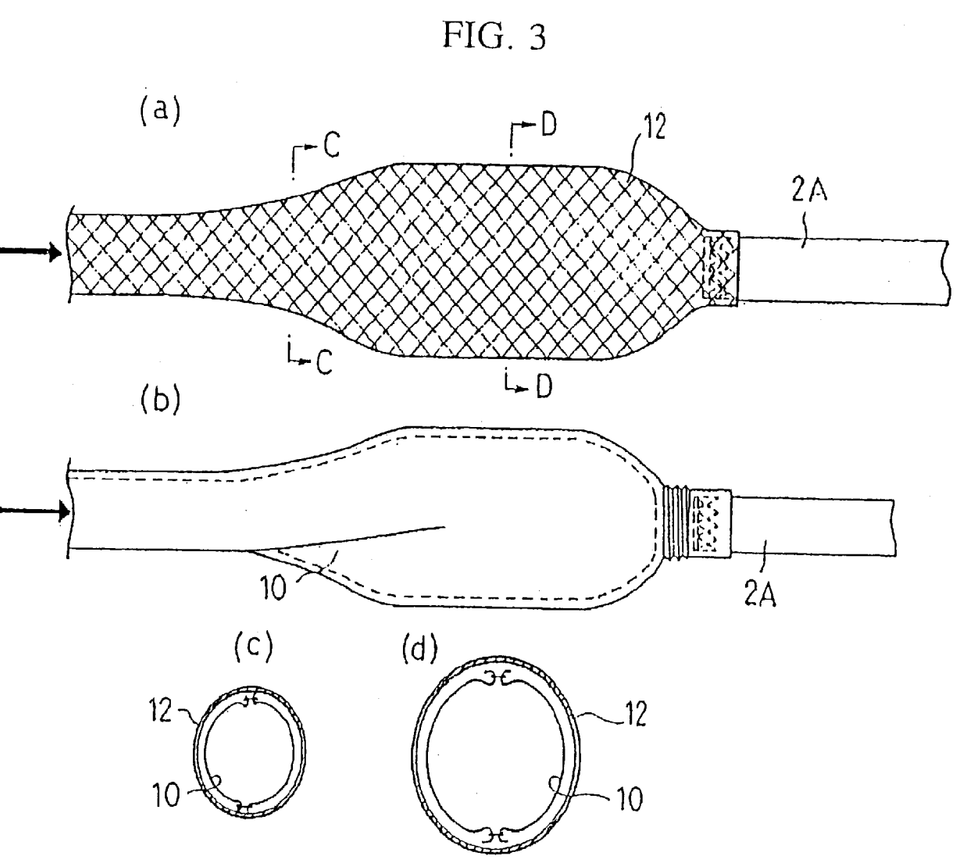
FIGS. 3(a)–3(d) are structural views of the inflatable belt in the inflated state.
Figure 4:
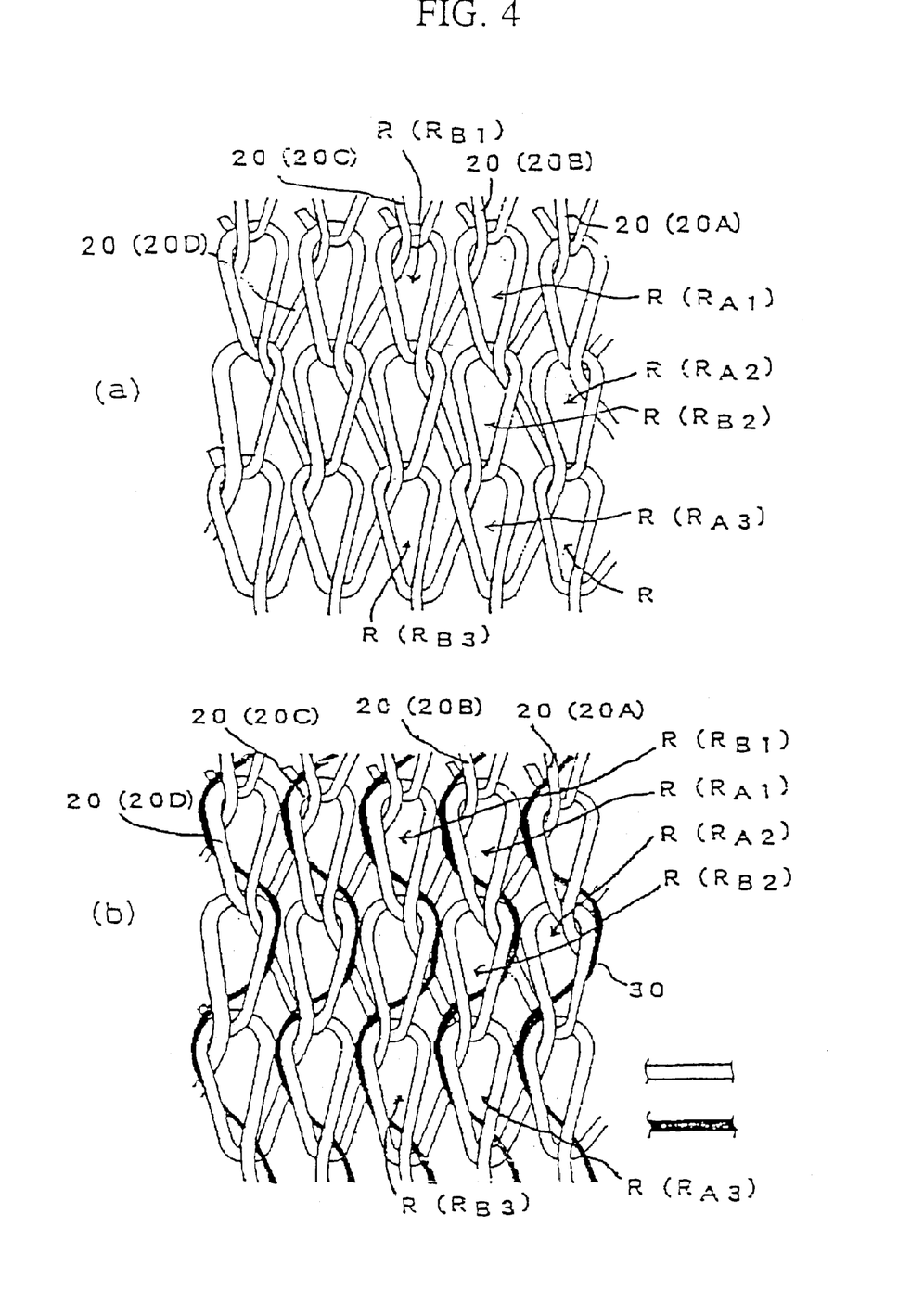
FIGS. 4(a) and 4(b) are views demonstrating a way of knitting a knit cover.

This inflatable belt device of the '903 application will now be described with reference to the attached drawings. FIG. 1(a) is a perspective view illustrating a vehicle cabin equipped with an inflatable belt device of the '903 application. FIG. 1(b) is a perspective view showing the inflatable belt device. FIG. 2(a) is a plan view showing a portion of the inflatable belt device at the connection between an inflatable belt and a webbing. FIG. 2(b) is a plan view showing an envelope-like belt. FIGS. 2(c), 2(d), 2(e) are sectional views taken along lines C—C, D—D, and E—E of FIG. 2(a), respectively. FIG. 3(a) is a plan view showing a shoulder belt in a state where the inflatable belt is inflated. FIG. 3(b) is a plan view showing the envelope-like belt in the inflated state. FIGS. 3(c) and 3(d) are sectional views taken along lines C—C and D—D of FIG. 3(a), respectively. FIGS. 4(a) and 4(b) are views for explaining a way of knitting a cover for the inflatable belt.

Figure 1:
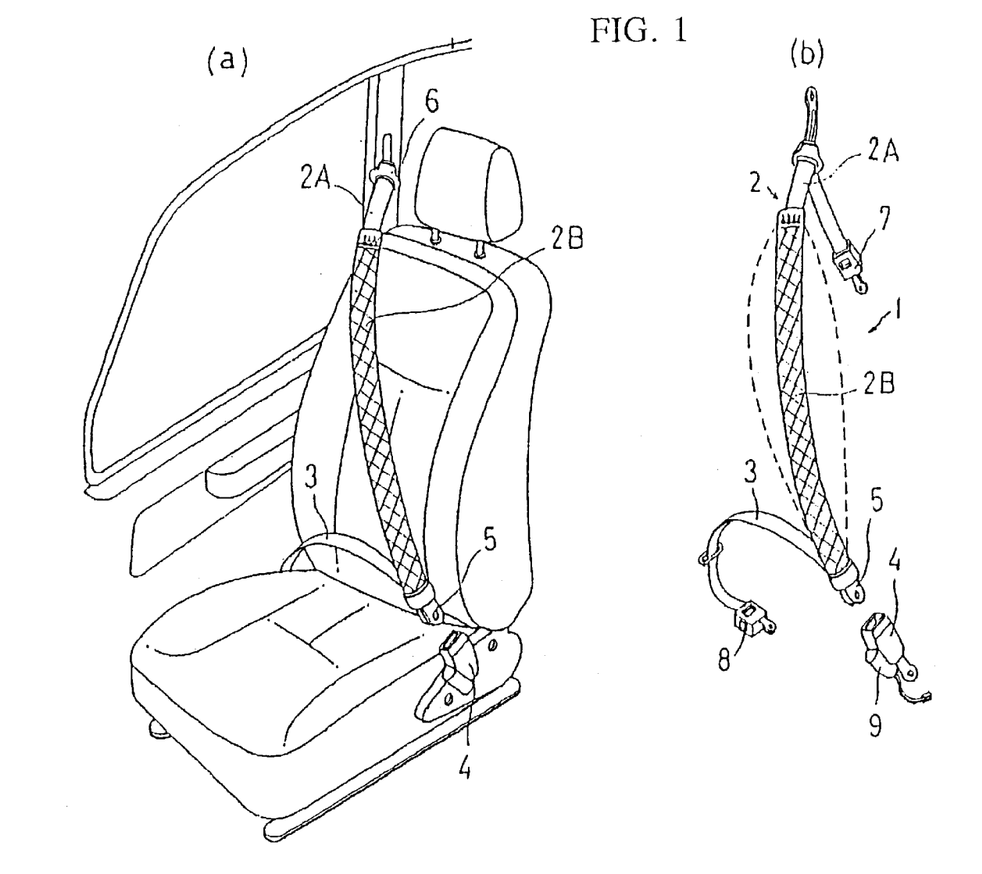
FIG. 1(a) is a perspective view illustrating a vehicle cabin equipped with an inflatable belt device of the '903 application.
FIG. 1(b) is a perspective view showing the inflatable belt device.

As shown in FIG. 1, this inflatable belt system 1 comprises a shoulder belt 2 extending diagonally from the right side to the left side of an occupant, a lap belt 3 extending from the right side to the left side of the occupant, a buckle unit 4 fixed to a vehicle floor or the like, a tongue 5 to be inserted into and engaged with the buckle unit 4 when the belt is about to be worn, and an intermediate guide 6 for guiding the shoulder belt 2.

The shoulder belt 2 comprises a webbing 2A which is the same as in a typical conventional seat belt, i.e. a normal belt, and an inflatable belt 2B connected to an end of the webbing 2A. The webbing 2A is slidably hung on the intermediate guide 6. The other end of the webbing 2A is connected to a seat belt retractor 7 with an emergency locking mechanism (ELR), which is fixed to the vehicle body. The webbing 2A is arranged in such a manner as to be wound into the seat belt retractor 7.

The inflatable belt 2B is positioned to be in contact with the occupant, and is connected to the tongue 5 at an end opposite to the end connected to the webbing 2A.

The lap belt 3 comprises a normal belt which is the same as in a typical conventional seat belt, of which one end is connected to the tongue 5 and the other end is connected to the seat belt retractor (ELR) 8, which is fixed to the vehicle body. Further, connected to the buckle unit 4 is a gas generator 9 which acts in the case of an emergency such as a vehicle collision and generates high pressure gas.

The tongue 5 and the buckle unit 4 are provided with passages for introducing gas from the gas generator 9 into the inflatable belt 2B.

As shown in FIGS. 2(a) through 3(d), the inflatable belt 2B comprises an envelope-like belt 10 and a cylindrical knit cover 12 surrounding the envelope-like belt 10. The envelope-like belt 10 has a wide portion corresponding to the chest and waist of the occupant sitting on the vehicle seat. The envelope-like belt 10 is folded into a shape of a band by folding the wide portion as shown in FIG. 2(b). The envelope-like belt 10 is stitched together with stitches 11.

The knit cover 12 is supplely stretchable in the lateral (course) direction, but is hard to stretch in the longitudinal (course) direction. FIGS. 4(a) and 4(b) illustrate ways of knitting this knit cover, respectively.

FIG. 4(a) illustrates a general way of warp-knitting of yarns 20 wherein a plurality of yarns 20 (20A–20D) form loops R. Each yarn 20 extends upwardly to make loops R on the left side and the right side alternately. Each yarn 20 extends in such a manner that the upper end of each loop R (for example, the upper end of a loop $R_{B2}$) is twined around the root of one of the adjacent loops (for example, the root loop $R_{A1}$) and the root of each loop R (for example, the root of the loop $R_{B2}$) is twined by the upper end of one of the adjacent loops (for example, the upper end of a loop $R_{A3}$). Therefore, the loops R are arranged to be continued in the vertical direction in the drawing and loops of a left-side yarn and loops of a right-side yarn are alternated in the vertical direction. That is, the loop $R_{A1}$, the loop $R_{B2}$, and the loop $R_{A3}$ are arranged downwardly in this order.

FIG. 4(b) shows a way of warp-knitting wherein insert yarns 30 are knitted in addition to the yarns 20 to increase the strength of an obtained fabric and to reduce the thickness of the obtained fabric. Each insert yarn 30 is knitted in such a manner as to extend along a vertical array of loops and pass through intersections of loops on the front and the back alternately. As shown in FIG. 4(b), each insert yarn 30 is twined about one vertical array of loops.

The inflatable belt 2B and the lap belt 3 are connected to the tongue. The knit cover 12 is attached to both the webbing 2A and the tongue 5 so that the knit cover 12 is subjected to tension load applied to the inflatable belt.

As the gas generator 9 is actuated when the tongue 5 is latched to the buckle unit 4, the inflatable belt 2B is inflated. During the inflation, the knit cover 12 is shortened in the longitudinal direction of the inflatable belt 2B so that the inflatable belt 2B is tightened against the occupant, thereby securely protecting the occupant.

Figure 5:
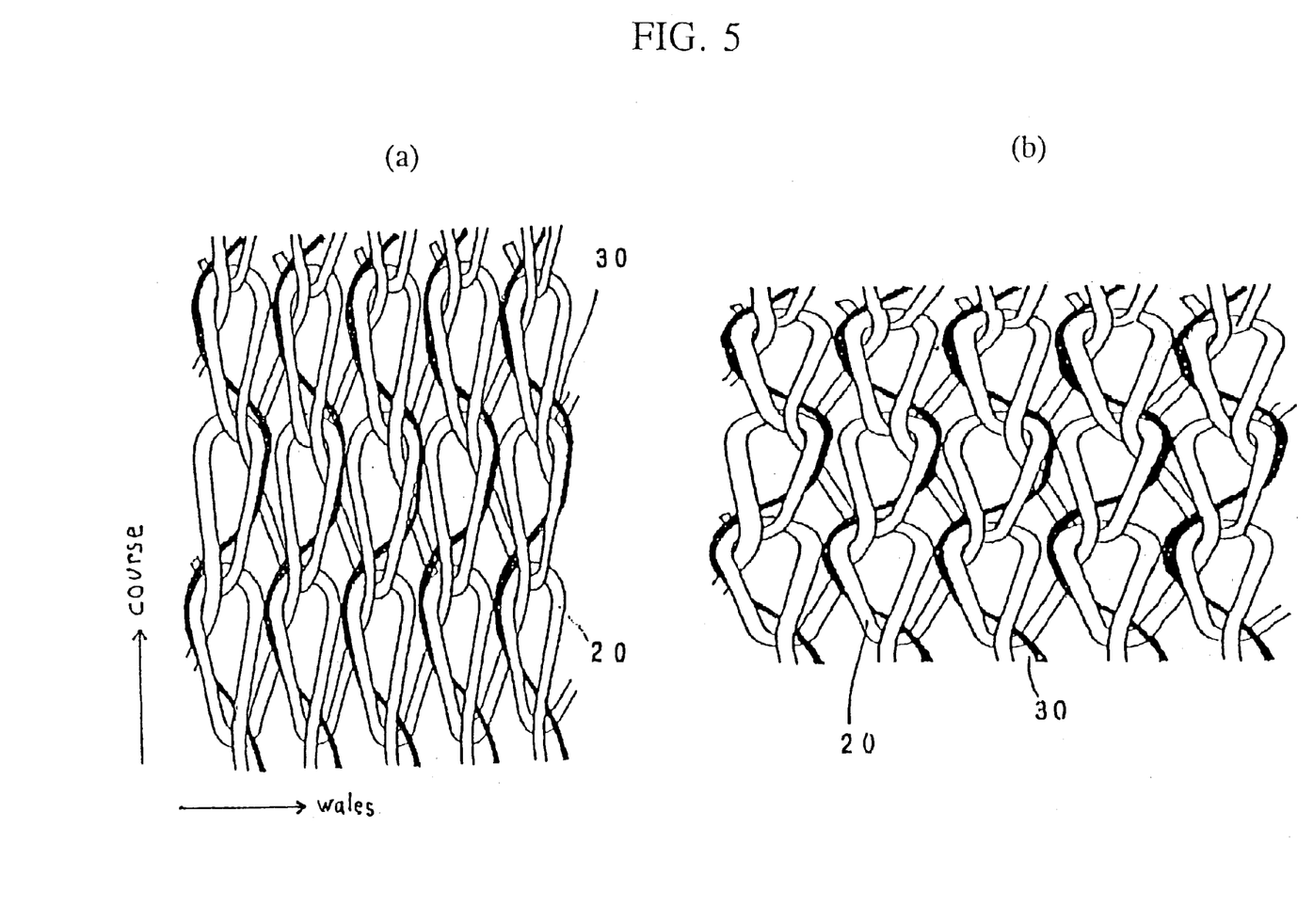
FIG. 5(a) is an explanatory view showing the knit cover in the normal state.
FIG. 5(b) is an explanatory view showing the knit cover in the inflated state.

FIG. 5(a) shows the normal state where the knit cover. FIG. 5(b) shows a state where the knit cover 12 made of the warp-knitted fabric using the insert yarns 30 shown in FIG. 4(b) is shortened in the longitudinal (course) direction and lengthened in the lateral (wales) direction when the inflatable belt 2B (the envelope-like belt 10) is inflated. As mentioned above, the knit cover 12 has been processed by a heat-stretching process whereby the knit cover 12 is hard to stretch in the longitudinal direction. Therefore, when the envelope-like belt 10 is inflated, the knitted loops of the knit cover 12 are elongated in the lateral direction with the result that the length of the knit cover 12 is shortened in the longitudinal direction, shortening the length of the inflatable belt 2B.

In the inflatable belt device, when the inflatable belt is inflated as the gas generator is actuated, the cover is also inflated. Since the cover is hard to stretch in the longitudinal direction of the inflatable belt, the length of the cover is shortened during the inflation of the inflatable belt. The length of the inflatable belt is also shortened according to the shortening of the cover. As a result of this shortening, the inflatable belt is strongly fitted to the occupant, thereby securely protecting the occupant.

Figure 7:
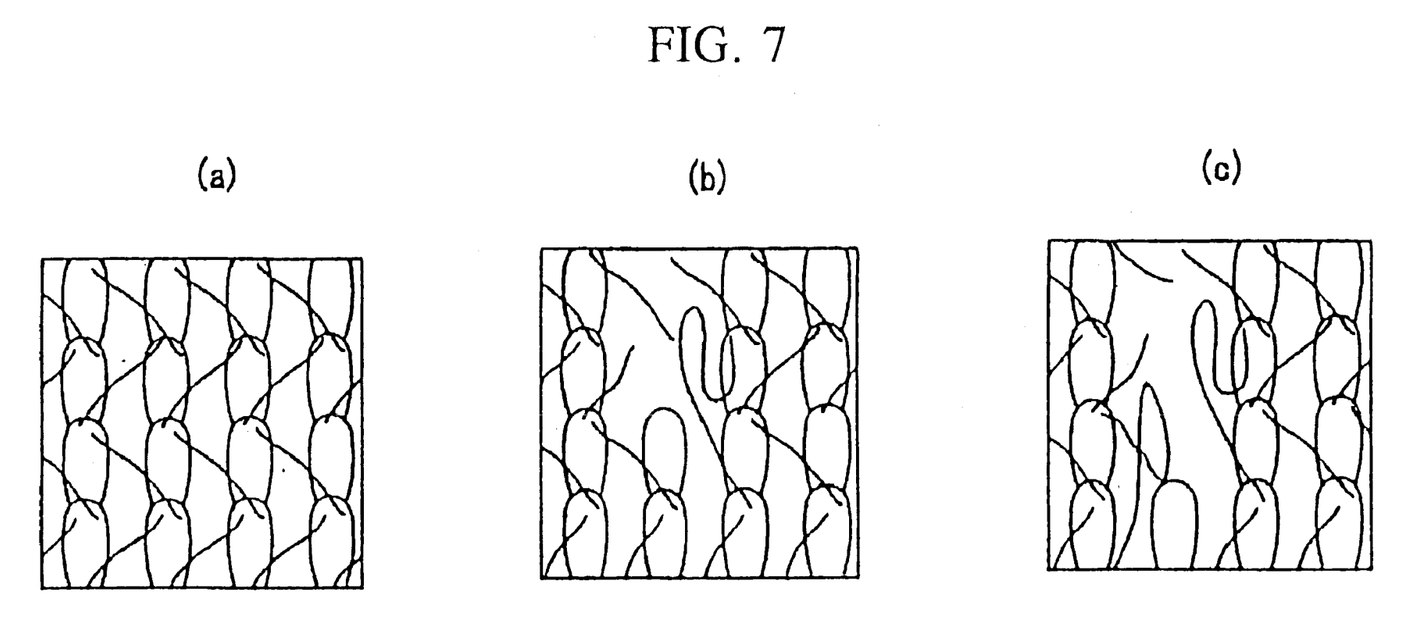
FIGS. 7(a)–7(c) are views for explaining the state in which fabric "run" occurs.

FIGS. 7(a)–7(c) are schematic views illustrating states in which "run" is caused in a comparative example without insert yarns. As a yarn is cut in the state shown in FIG. 7(a) and one twin of the loop is cancelled, loops are successively disengaged and the torn portion thus extends as shown in FIGS. 7(b), 7(c). By adding insert yarns into such a fabric, such extension of a torn portion can be prevented.

It is therefore an object of the present invention to improve the resistance to run (laddering) of a warp-knitted fabric for an inflatable belt cover with insert yarns.

SUMMARY OF THE INVENTION

The present invention is a warp-knitted fabric for an inflatable belt cover for covering an envelope-like belt which composes an inflatable belt that is folded into the shape of a band. The warp-knitted fabric comprises knitting yarns and insert yarns inserted among the knitting yarns. Each insert yarn is twined to pass through three or more vertical arrays of loops. At least two continuous loops are formed by chain-stitching a knitting yarn to compose a base knit structure.

In the warp-knitted fabric for an inflatable belt cover of the present invention, each insert yarn is twined to pass through three or more vertical arrays of loops and at least two continuous loops are formed by chain-stitching a knitting yarn to compose a base knit structure, thereby obtaining significantly improved resistance to "run" of fabric.

BRIEF DESCRIPTION OF THE DRAWINGS

FIGS. 6(a) and (b) are structural views of warp-knitted fabrics for the inflatable belt cover according to embodiments of the present invention.

DETAILED DESCRIPTION OF THE PREFERRED EMBODIMENTS

Hereinafter, embodiments of the present invention will be described with reference to FIGS. 6(a) and 6(b).

A warp-knitted fabric for an inflatable belt cover of the present invention is made of normal warp yarns 20 and insert yarns 30. The insert yarns 30 are inserted in a basic knit fabric in such a manner that each insert yarn 30 is twined to pass over three vertical arrays of loops.

Figure 6:
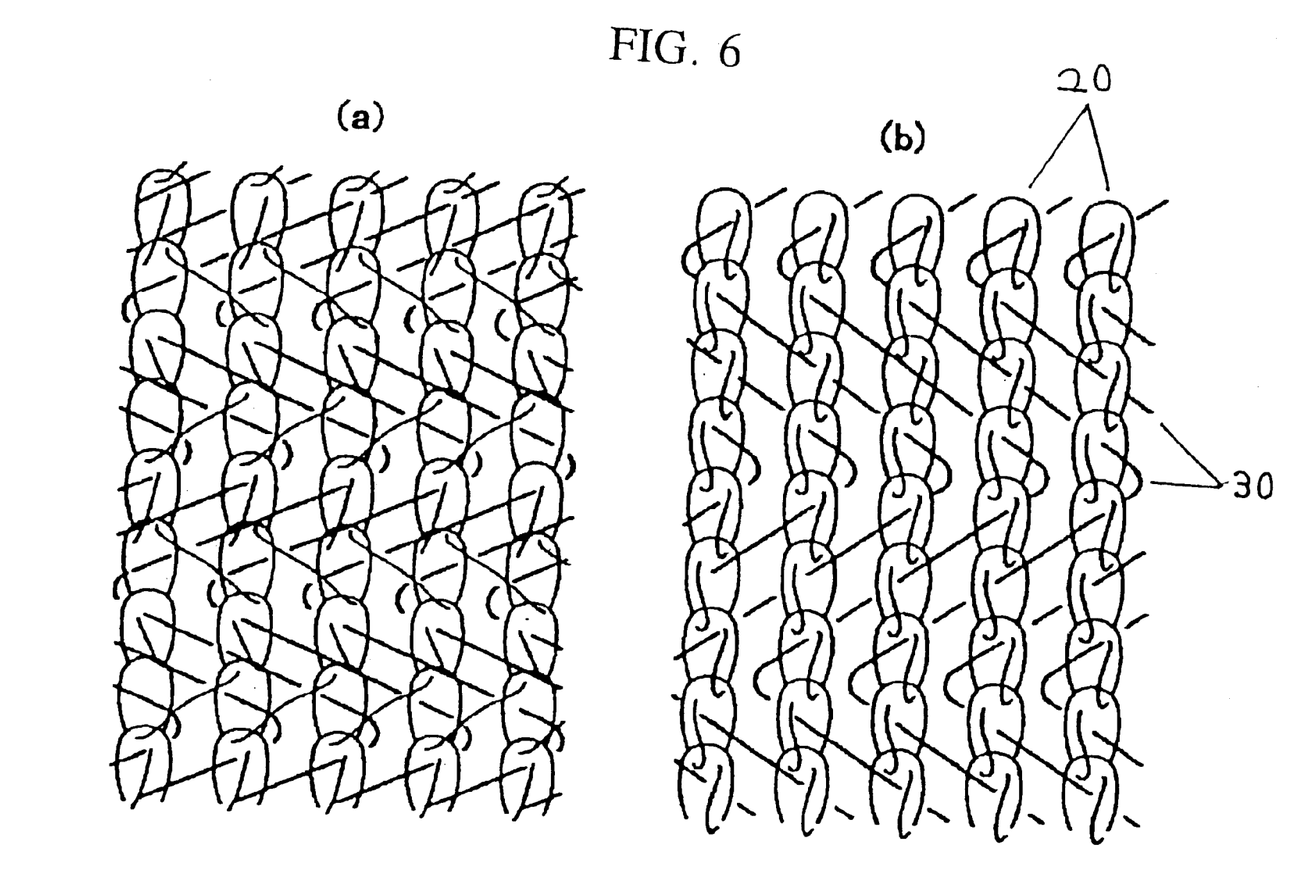

In a first embodiment, shown in FIG. 6(a), pairs of loops are formed in the vertical direction by chain stitching a knitting yarn. That is, after two loops vertically continued are formed on one vertical array, the knitting way is shifted to an adjacent vertical array so that another two loops are formed on the adjacent array. After that, the knitting way is returned to the original vertical array again. The fabric is made by repeating this movement.

In a second embodiment, shown in FIG. 6(b), vertical chain stitches are continued only in the vertical direction and the connection between adjacent vertical arrays is achieved only by the insert yarns 30.

In either of the knitting structures shown in FIGS. 6(a) and 6(b), each insert yarn 30 is twined to extend over three vertical arrays. For example, with regard to three vertical arrays: left, middle, and right, the insert yarn 30 passes through these arrays in the order of left -→middle -→ right -→middle -→left -→middle -→right -→middle. This way is then repeated.

Each insert yarn 30 is twined to pass through loops of three vertical arrays, thereby preventing "run" of the fabric.

According to the present invention, it is preferable that each insert yarn 30 is twined to pass through three to six vertical arrays.

According to the present invention, the knitting yarns 20 and the insert yarns 30 (hereinafter, these will be generally referred to as "structural yarns") are made of thermoplastic synthetic filaments, such as polyamide or polyester, of which yarn strength is 8.0 g/denier or more.

In the present invention, the structural yarns are preferably made of fine filaments of 5–10 deniers. More particularly, each of the insert yarns 30 is preferably formed by making two yarns, each formed by collecting 100–300 filaments of 5–10 deniers so as to have 1000–3000 deniers, and then joining the two yarns to totally have 3000 or less of deniers, while each of the knitting yarns 20 is preferably formed by collecting 30–300 filaments of 5–10 deniers so as to have 250–1500 deniers, wherein the number of denier of the knitting yarn 20 is less than that of the insert yarn 30.

The warp-knitted fabric used for the inflatable belt cover of the present invention is preferably processed by a heat-stretching process so as to set its elongation and control its width.

According to the present invention, the number of insert yarns used is preferably determined according to desired tensile strength characteristics.

The warp-knitted fabric for the inflatable belt cover of the present invention has preferably a thickness of 1.0–2.0 mm and a tensile force (hereinafter, referred to as "lengthwise restricted tensile force") of 200–600 kgf to be exerted in a longitudinal direction (course) due to the elongation in the lateral direction (wales) at 100 kPa.

As described above, the present invention can provide a warp-knitted fabric for an inflatable belt cover having excellent resistance to "run" of fabric, as a knit cover for an inflatable belt device.

The above description and drawings are illustrative only because modifications could be made without departing from the present invention, the scope of which is to be limited only by the following claims.

The priority documents, Japanese Application No. H11-006692 and H11-276855, filed Jan. 13, 1999 and Sep. 29, 1999 respectively, are hereby incorporated by reference into this application.

What is claimed is:

1. A warp-knitted fabric for an inflatable belt cover for covering an envelope-like belt which composes an inflatable belt and is folded into a shape of a band, said warp-knitted fabric comprising knitting yarns and insert yarns inserted among said knitting yarns, wherein said knitting yarns are knitted to form vertical arrays of loops, at least two continuous loops are formed by chain-stitching the knitting yarn to compose a base knit structure, and each insert yarn is twined to pass at least three of the vertical arrays of loops; and wherein each insert yarn has a denier between 1000 and 3000.

2. The fabric of claim 1, wherein each insert yarn has a denier greater than each knitting yarn.

* * * * *